(12) United States Patent
Scicluna et al.

(10) Patent No.: US 11,386,359 B2
(45) Date of Patent: *Jul. 12, 2022

(54) SYSTEMS AND METHODS FOR MANAGING A VEHICLE SHARING FACILITY

(71) Applicant: ADDISON LEE LIMITED, London (GB)

(72) Inventors: Larry Scicluna, London (GB); Yuriy Bernatskiy, Samara (RU)

(73) Assignee: ADDISON LEE LIMITED, London (GB)

( * ) Notice: Subject to any disclaimer, the term of this patent is extended or adjusted under 35 U.S.C. 154(b) by 710 days.

This patent is subject to a terminal disclaimer.

(21) Appl. No.: 15/051,846

(22) Filed: Feb. 24, 2016

(65) Prior Publication Data

US 2016/0247095 A1  Aug. 25, 2016

(30) Foreign Application Priority Data

Feb. 24, 2015 (GB) ...................................... 1503079

(51) Int. Cl.
*G06Q 10/02* (2012.01)
*G06Q 50/30* (2012.01)

(52) U.S. Cl.
CPC ............. *G06Q 10/02* (2013.01); *G06Q 50/30* (2013.01)

(58) Field of Classification Search
CPC ............................... G06Q 10/02; G06Q 50/30
See application file for complete search history.

(56) References Cited

U.S. PATENT DOCUMENTS

| 7,080,019 B1 * | 7/2006 | Hurzeler | G06Q 10/025 |
| | | | 705/6 |
| 7,840,427 B2 * | 11/2010 | O'Sullivan | G06Q 10/00 |
| | | | 705/6 |

(Continued)

OTHER PUBLICATIONS

Furuhata, M., Dessouky, M., Ordóñez, F., Brunet, M., Wang, X., & Koenig, S. (2013). Ridesharing: The state-of-the-art and future directions. Transportation Research Part B: Methodological, 57, 28-46. doi: 10.1016/j.trb.2013.08.012 (Year: 2013).*

(Continued)

*Primary Examiner* — Rupangini Singh
*Assistant Examiner* — Manal A. Alsamiri
(74) *Attorney, Agent, or Firm* — Potomac Law Group, PLLC; George Dolina

(57) ABSTRACT

A method and apparatus for managing a networked vehicle resource sharing facility, the method and system provide for:
  (a) detecting a plurality of inputs corresponding to vehicle booking requests, wherein each of the plurality of vehicle booking requests contains data identifying a drop-off location and a pick-up location that is distinct from the pick-up location of each of the other customers;
  (b) accessing a data structure containing stored data relating to user authorisations for using the vehicle-sharing facility to verify whether each of the vehicle booking requests relates to a customer authorised to use the vehicle-sharing facility; and
  for those vehicle booking requests relating to customers identified as being authorised to use the vehicle-sharing facility:
  (c) automatically selecting customers to share a vehicle and calculating a suggested route for the vehicle (Continued)

using the pick-up location and drop-off locations of the customers and one or more stored vehicle-share criteria.

20 Claims, 9 Drawing Sheets

(56) References Cited

U.S. PATENT DOCUMENTS

| | | | |
|---|---|---|---|
| 2006/0182258 A1* | 8/2006 | Sisselman | H04M 3/5175 |
| | | | 379/265.02 |
| 2009/0216600 A1 | 8/2009 | Hill | |
| 2010/0042549 A1* | 2/2010 | Adamczyk | G01C 21/3438 |
| | | | 707/E17.014 |
| 2011/0099040 A1* | 4/2011 | Felt | G01C 21/3438 |
| | | | 715/764 |
| 2011/0153629 A1* | 6/2011 | Lehmann | G06Q 30/06 |
| | | | 707/E17.014 |
| 2011/0301997 A1* | 12/2011 | Gale | G06Q 10/1097 |
| | | | 705/7.26 |
| 2012/0078672 A1 | 3/2012 | Mohebbi et al. | |
| 2012/0290652 A1* | 11/2012 | Boskovic | G06Q 10/02 |
| | | | 709/204 |
| 2014/0278051 A1* | 9/2014 | McGavran | G01C 21/3492 |
| | | | 706/45 |
| 2015/0046080 A1 | 2/2015 | Wesselius et al. | |
| 2015/0185034 A1* | 7/2015 | Abhyanker | G01C 21/36 |
| | | | 701/23 |
| 2015/0233719 A1* | 8/2015 | Cudak | B60K 35/00 |
| | | | 701/23 |
| 2015/0345951 A1* | 12/2015 | Dutta | G01C 21/3469 |
| | | | 701/400 |
| 2017/0270447 A1* | 9/2017 | Borean | H04W 4/023 |

OTHER PUBLICATIONS

International Search Report and Written Opinion dated May 24, 2016 in Application No. PCT/IB2016/051008.

* cited by examiner

SYSTEMS AND METHODS FOR MANAGING A VEHICLE SHARING FACILITY

FIELD

The present invention relates to systems and methods for managing a vehicle sharing facility.

BACKGROUND

Traditionally, private hire vehicle resources are allocated exclusively to an individual booking. If the vehicle is booked to carry several passengers, then this arrangement is usually satisfactory. However, if a vehicle having more seats than the number of passengers in a booking is allocated, the extra capacity of the vehicle is not put to efficient use.

Hitherto, while it may be possible for two or more passengers from separate bookings to share a vehicle, this is arranged on an ad hoc basis which can be haphazard and unstructured.

BRIEF DESCRIPTION OF THE DRAWINGS

Embodiments of the invention will now be described, by way of example only, with reference to the accompanying drawings, in which.

DETAILED DESCRIPTION

Figure 1A:
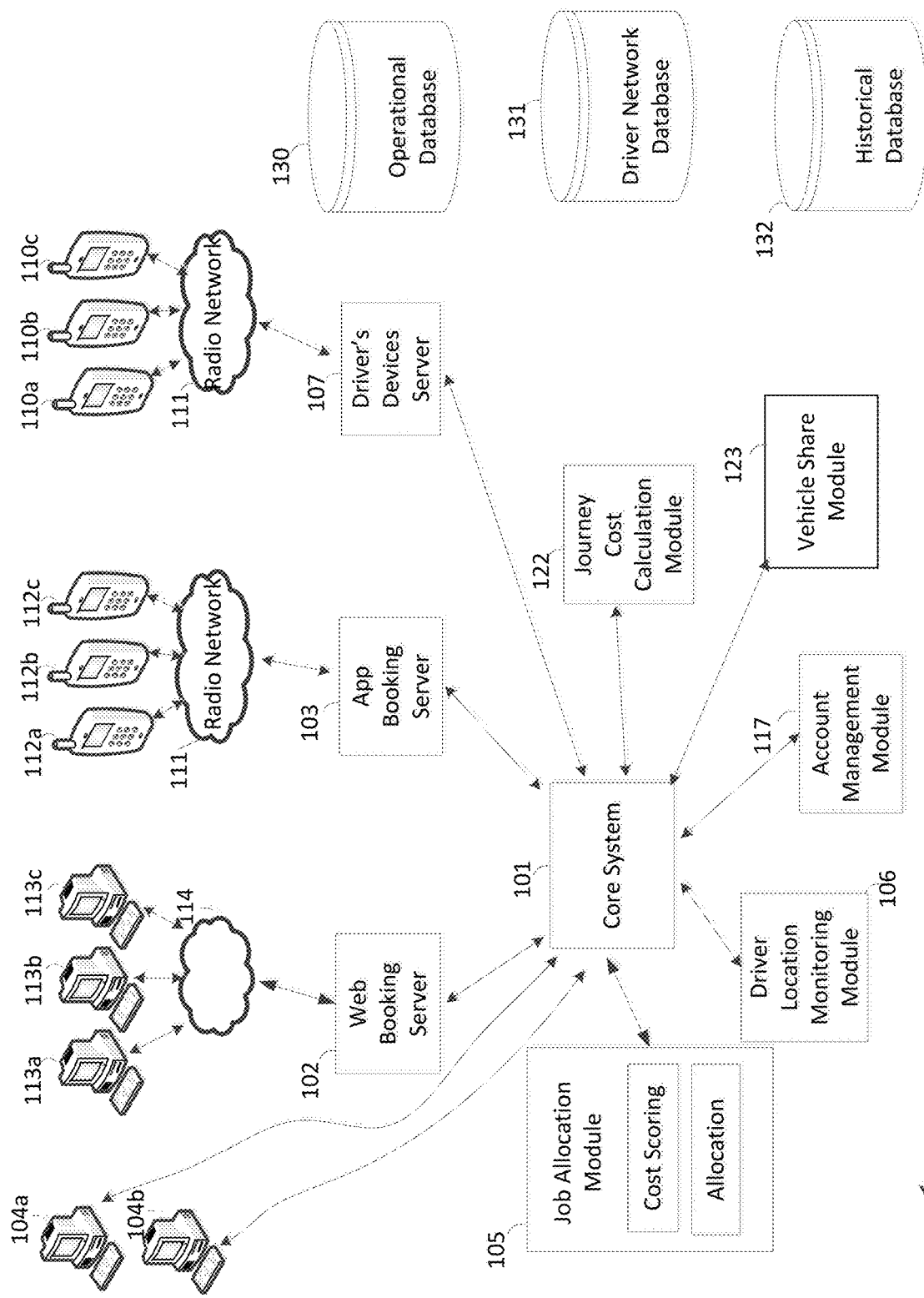
FIG. 1a is a schematic diagram of a system for management of a private hire vehicle service according to various aspects of the present invention.

Embodiments of the invention provide a process for processing vehicle booking requests so that customers can share vehicles with other customers in an intelligent and efficient way. Customers are identified according to whether they wish to use vehicle sharing where possible. Each customer's requested pick up and drop off locations can be used to help identify other customers with whom a customer can share and a suggested route can be calculated. The suggested route is calculated to be a convenient route for both customers and drivers.

Vehicle sharing can lead to cost savings for the customer and to distance (or mileage) savings for the driver. The number of vehicles needed to perform a certain number of jobs can be reduced in comparison to allocating a vehicle to each customer. This is particularly advantageous during peak times when vehicle resources may be busier. By reducing the number of vehicles needed to complete a given number of bookings, road congestion and carbon emissions can be reduced.

In accordance with some embodiments, systems, methods, apparatus, and computer-readable media provide for:

(a) detecting a plurality of inputs corresponding to vehicle booking requests, wherein each of the plurality of vehicle booking requests contains data identifying a drop-off location and a pick-up location that is distinct from the pick-up location of each of the other customers;

(b) accessing a data structure containing stored data relating to user authorisations for using the vehicle-sharing facility to verify whether each of the vehicle booking requests relates to a customer authorised to use the vehicle-sharing facility; and for those vehicle booking requests relating to customers identified as being authorised to use the vehicle-sharing facility:

(c) automatically selecting customers to share a vehicle and calculating a suggested route for the vehicle using the pick-up location and drop-off locations of the customers and one or more stored vehicle-share criteria.

Automatically selecting customers to share a vehicle and calculating a suggested route may comprise identifying several potential routes, applying a score to each potential route and selecting the route determined to have the best score.

Each customer request may contain data specifying the same drop-off location.

Each customer request may contain data specifying a drop-off location that is distinct from the drop-off location of each of the other customers.

In accordance with some embodiments, systems, methods, apparatus, and computer-readable media may further provide for: detecting one or more user inputs relating to one or more vehicle-share criteria at a user interface and using these values at (c).

The vehicle-share criteria may comprise data representing a vehicle capacity value.

The vehicle-share criteria may comprise data representing a vehicle number.

The data representing vehicle number may specify a number of vehicles in each of a plurality of vehicle types.

The vehicle-share criteria may comprise data representing an average speed value.

The vehicle-share criteria may comprise data representing a stop distance.

The vehicle-share criteria may comprise data representing a corridor rule absolute width and/or a corridor rule relative width multiplier.

The vehicle-share criteria may comprise data representing a maximum relative deviation.

The vehicle-share criteria may comprise data representing at least one of the following: a normal early time value, a maximum early time value, a normal late time value, and a maximum late time value.

The vehicle-share criteria may further comprise data representing at least one of the following: a before normal early time penalty, an after normal early time penalty, a before normal late time penalty and an after normal late time penalty.

The vehicle-share criteria may comprise data representing an allowed waiting time and optionally a waiting time penalty.

Verifying whether each of the customers is authorised to use the vehicle-sharing facility may comprise determining if a customer record is associated with an account having an instruction allowing vehicle share.

The plurality of vehicle booking requests may comprise a request for an autonomous vehicle.

FIG. 1a is a schematic diagram of a system for management of a private hire vehicle service according to various aspects of the present invention.

The system 100 includes a number of interconnected components, as will now be described. The system 100 includes at its centre a core system 101. This comprises one or more server computers running system software that ensures smooth operation of the system 100.

Key functions of the system 100 are bookings, allocation of a private hire vehicle to a booking, vehicle and driver management, account management and record keeping.

The booking function is provided primarily by a web booking server 102, an application booking server 103 and call centre terminals 104A and 104B, all of which are coupled to the core system 101.

The allocation function is provided primarily by a job allocation module 105, with information from other parts of the system 100.

The system includes database functions. In particular, an operational database 130 stores records that relate to general operation of the system 100. A driver network database 131 stores records that relate to drivers and vehicles that are managed by the system 100. Lastly, a historical database 132 stores records that have been archived from the operational database 130. Archiving of records from the operational database 130 to the historical database 132 occurs periodically and only records that are no longer needed for general operational use are archived.

The vehicle and driver management function is provided primarily by a driver location monitoring module 106 and a driver's devices server 107, with reference to the driver network database 131 as well as other components of the system 100.

The account management function is provided primarily by an account management module 117, utilising accounts information stored in the operational database 130 along with other components of the system 100.

The operational database 130 stores details of every account held with the operator of the system 100. Each account is identified by an account number stored in the operational database 130. The accounts information stored in the operational database 130 may also include an account name, such as a company name and contact details for the company. The accounts information stored in the operational database 130 stores credit card details and/or other payment details so that payment can be taken from the account holder if permitted. A password and/or PIN (personal identification number) is associated with each account and stored with the accounts information in the operational database 130. Furthermore, a list of persons authorised to make bookings on the account may be stored, and optionally profiles for the individual authorised persons within the accounts.

The accounts information stored in the operational database 130 may also include a contact name and telephone number of a person who should be contacted in case of problems with the account. The accounts information stored in the operational database 130 includes information regarding invoicing preferences, for example the frequency of invoicing, date on which the invoice should be sent, the monthly/weekly credit limit and what information from each booking should be included on the invoice. The accounts information stored in the operational database 130 may indicate whether each account is active, or if it has been placed on hold. An account may be placed on hold by a credit control department and this may prevent further bookings being made on the account. Historical data of spending on the account may also be stored in the operational database 130, or this may be stored in the historical database 132.

The record keeping function is provided primarily by the historical database 132, although the operational database 130 and the driver network database 131 also provide some record keeping function.

In brief, a fleet of private hire vehicles is managed by the system 100. Each vehicle has a respective record in the driver network database 131, as will now be described.

The driver network database 131 stores information about every vehicle in the fleet. The registration number (licence plate number) of each vehicle is stored in the driver network database 131. This may be used to identify each vehicle. Alternatively or in addition, a unique identifier separate from the registration number may be assigned to each vehicle as the primary means of identification within the driver network database 131.

Each Service is defined according to its vehicle type, capacity and other characteristics. In some embodiments, these types are "Up to 4 passengers", "Up to 7 passengers", "Electric vehicle", "VIP" and "Up to 4 passengers with luggage". The driver network database 131 stores the type of each vehicle and may also store a corresponding number or short string of characters which represents each type. Any special equipment such as a baby seat or the ability to accommodate a wheelchair is also identified in the driver network database 131. The driver network database 131 indicates the current driver to whom the car is assigned, although the driver/vehicle allocation changes from time to time.

The driver network database 131 stores the make and model and optionally the colour of each vehicle. The driver network database 131 also indicates the current status of the vehicle. In some embodiments, the status is chosen from "Driver Pool", meaning that the car is in use by a driver, "Free Pool", meaning that the car is not currently being used and is free to be allocated to a driver and "Workshop", meaning that the car is undergoing maintenance or repair. The driver network database 131 also stores the private hire licence number (PCO) for each vehicle and the date on which this licence expires as well as the road tax, vehicle insurance and MOT (vehicle roadworthiness certificate) expiry dates if appropriate. Examples of other data which may be stored are the date of purchase of the vehicle, the price paid for the vehicle, the date of manufacture, the supplier of the vehicle, warranty information and the date of the last inspection/maintenance.

Historic data about each vehicle may also be stored in the driver network database 131, such as a record of the previous registration numbers and a record of the previous drivers who were assigned to the vehicle. The service history and details of any accidents and repairs may also be stored.

The fleet of private hire vehicles is driven by a pool of drivers, each of which has a record in the driver network database 131.

The driver network database 131 stores information about each of the drivers registered with the operator of the system 100. The information relating to drivers includes personal data such as name, contact details (including phone number, home address), date of birth, next of kin and driver account data. Driver status information may be stored to indicate whether a driver is active or inactive, whether the driver has been allocated a vehicle etc. Each driver may also be assigned an individual and unique identifier as a means of identifying the driver. Callsigns may also be used to denote drivers and are stored in the driver network database 131, although callsigns can be changed and reallocated between drivers as long as the same callsign is not in use by two drivers at the same time.

Driver account data includes an account number. Other information may include a driver's insurance details, a driver's length of service in the fleet, details of parking fines, historical wage information, holiday leave, driver diary information, information regarding payment collections from drivers, driver's licence number, national insurance (social security) number, details relating to a driver's taxicab licence (such as Public Carriage Office (PCO) licence), driver banking details (account number, sort code etc.). Miscellaneous information such as details of any allergies, smoker/non-smoker etc. may also be stored in the driver network database 131. Information regarding driver equipment such as a serial number of the driver's device 110 allocated to the driver, and mobile phone number of their driver's device 110 and their private mobile phone may also be recorded. Statistical information such as date of last job or historical earnings data may be recorded in the driver network database 131, or this may be recorded in the historical database 132.

Information relating to payments to and from drivers may be stored in the driver network database 131. Payments to the driver include a driver's wages. Driver outgoings may include, for example, car wash charges, insurance premiums, PCO renewal fee, accident costs, vehicle rental. To assist in maintaining this information, a purchase ledger number and contract number relating to each driver may be stored.

Each driver has an associated driver's device 110, three of which are shown at 110A, 110B and 110C in the Figure. The driver's devices 110 are portable electronic devices that are provided with wireless communication facilities. The driver's devices 110 may take any suitable form, but typically are smart phones or personal digital assistants or such like. The driver's devices 110 include a display and one or more input devices such as a keyboard, a voice control module or a touch screen or any combination thereof.

The driver's devices 110 are connected to the driver's devices server 107 via radio network 111, which may for instance be a mobile phone (cellular phone) network. In this case, the driver's devices 110 are provided with subscriptions to the mobile phone network such that they can send digital data to and from the driver's devices server 107. Additionally, messages are able to be passed between the driver's devices no and the driver's devices server 107 through other media, and in particular SMS (short message service) messages and optionally also MMS (multimedia message service) messages.

The radio network 111 may alternatively be a dedicated radio network, for instance a private mobile phone network or a private radio network of some other type.

Data may be communicated between the driver's devices 110 and driver's devices server 107 over any suitable communications link, for instance using a data channel of a cellular telephone network such as a GSM, EDGE, GPRS, UMTS, HSxPA or LTE network.

The driver's devices 110 are configured to report their locations to the driver network database 131 at regular intervals, for instance 30 second intervals. The driver's devices 110 include GPS (global positioning system) receivers, which calculate the locations of the driver's devices 110 under control of the software applications executing on the driver's devices 110. Alternatively, they may include some other positioning module or device that is operable to calculate the positions of the driver's devices 110 with a suitable level of accuracy and resolution.

A private hire vehicle may be booked by a customer in one of three ways. Firstly, a private hire vehicle may be booked in a telephone conversation with a call centre operator. In this case, the customer initiates a telephone call with a call centre, an agent of which operates one of the call centre computer terminals 104A and 104B. The call centre agent then operates the terminal 104A, 104B so as to make the booking of the private hire vehicle according to the customer's requirements. The customer's requirements are obtained verbally during the telephone conversation between the customer and the agent.

In the second option, the customer may make the private hire vehicle booking using a browser application on a computing device 113, three examples of which are shown at 113A, 113B and 113C in the Figure. Each of the computing devices 113 is connected to the web booking server 102 by a network 114, which may for instance be the Internet or another public or private network. The web booking server 102 includes web server functionality that causes display of suitable web pages by the browser of the terminal 113. The customer's requirements with respect to the private hire vehicle booking are obtained by the web booking server 102 through the provision of suitable pages to the computer terminal 113 requesting the provision of the required information by the customer. The information may be provided by the customer through free text entry through the use of drop down lists, radio buttons etc. Some information may be pre-filled into the web pages provided by the web booking server 102.

Booking through the web booking server 102 may require the customer to login to a web portal before they can make their booking. The logging in may require the entering of a username and a password or PIN number. Through the control of a web session by the web booking server 102, for instance using cookies provided to the computer terminals 113, the booking can be known to have been validly made by virtue of the customer having being logged in to the web booking server at the time the booking was made.

The final way in which a customer can make a booking of a private hire vehicle is using a dedicated software application that is installed on and running on a portable communications device 112, three of which are shown at 112A, 112B and 112C in FIG. 1a. The portable communications devices 112 may take any suitable form, but typically are smart phones, feature phones, tablet computers or personal digital assistants or such like. The communication devices 112 are coupled to the application booking server 103 by a radio network in, which may be the same as the radio network in described above with relation to the driver's devices 110 and the driver's devices 107.

The application is configured to provide a user interface that allows the customer to provide the software application with the information required to make the private hire vehicle booking. For instance, the software application, when executed, may cause the display of interactive pages that allow the customer to select or enter the required information. The software application is configured also to communicate the information relating to the booking that has been provided by the customer to the application booking server 103. If based on information provided by the customer it is determined that the application booking server 103 requires additional information, the software application running the mobile device 112 is configured to provide an interactive display to the customer such that the customer can provide the information, following which the software application causes it to be provided to the application booking server 103.

The customer may be required to log in to the software application on the mobile device 112, prior to making a booking. Logging in to the software application may require a username and a password or PIN number. Alternatively, the username may be entered during set up of the application and may not need to be entered subsequently when this software application is executed. If the username is not required to be entered, the user may log in to the software application simply by entering the password or PIN number.

The information about the private hire vehicle booking that is obtained during the booking process is as follows.

Customer details. The customer details may be the name of the customer or an identifier that uniquely identifies the customer within the operational database 130.

Service type. This indicates the category of vehicle. For instance, the service type may indicate a vehicle of a standard type and having four seats, or a vehicle of a standard type and having seven seats. The service may alternatively indicate a VIP vehicle, or an environmentally-friendly (electric or hybrid) vehicle (also known as a green vehicle).

Journey type. The journey type may be a single (one-way) trip, or it may be a wait and return trip. The journey type may alternatively be a journey including multiple pick-up locations or multiple drop off locations or both multiple pick-ups and multiple drop off locations. The journey type may alternatively indicate that it is a pick-up from an airport or a drop at an airport.

Pick-up address. This indicates an address at which the customer is to be picked up at the beginning of the journey. The address is a natural language address. The address is selected from one of the plurality of addresses stored in a database. The addresses may be stored in the operational database 130 or the historical database 132, or they may be provided by an external address database service, for instance geo.me or qas.co.uk. The addresses each have associated therewith a verified coordinate location expressed in latitude and longitude. Multiple databases may be used (in a hierarchical fashion) for address lookup. The pick-up address may be selected by the customer in any suitable way, with the most appropriate way depending on whether the customer is using the software application on their mobile device, using the web booking service or using an agent in a call centre. If the journey type is an airport pick-up type, the pick-up address indicates the airport and terminal and optionally flight number.

Drop off address. The drop off address again is selected from one of multiple addresses stored in the database and is selected by the customer in any suitable way. If the journey type is an airport drop off type, the pick-up address indicates the airport and terminal and optionally flight number.

Pick-up date and time. This indicates a time and date which the customer requires the journey to start. Alternatively, the date and time may indicate ASAP (as soon as possible), if the customer requires the private hire vehicle at the earliest opportunity.

Optional information regarding the booking includes the following.

Customer's reference. This can be provided for instance as free text or selected from a drop-down menu. If a reference is provided, this information can be included in an account statement against a journey at a later date.

Additional comments. This is free text that provides any potentially relevant information, and may be provided to the driver once the booking has been allocated.

The system 100 comprises a journey cost calculation module 122. The journey cost calculation module 122 executes software code which determines the price for a requested journey, during the booking process and prior to vehicle allocation. Journey cost calculation is performed at the time of a booking and the result returned to the customer requesting the booking. The resulting cost for the journey is provided before the customer confirms the booking.

The journey cost calculation module 122 uses a number of different ways of calculating the base cost of the journey. The module 122 may set a fixed price for some journeys. These are agreed in advance with a particular account customer for journeys between pre-determined points. The journey cost calculation module 122 checks whether the booked journey and customer meet the requirements for a fixed price tariff. If the conditions are not met, then another pricing method is used. The journey cost calculation module 122 may use zonal pricing if a fixed price is not used. Where every point on the journey is within a defined zone, zonal pricing can be used. If neither fixed pricing nor zonal pricing is used, or if the conditions for their application are not met, then the journey cost calculation module 122 may use an A to B (A-B) pricing method. The A-B method may specify the number of units between points A and B. A unit price depending on the type of vehicle etc. is then used to calculate the price. If there is no A-B record for a particular journey, the crow fly (direct) distance (i.e. the length of a straight line between the pick-up and drop-off locations) is used to calculate the base cost for the journey. This method may use map grid references or alternatively may be based on GPS data, i.e. the latitude and longitude of the pick-up and drop-off points.

The journey cost calculation module 122 may retrieve all the map and location information needed to make these calculations from the historical database 132. The historical database 132 may store a detailed geospatial model of a particular region, such as a city. As an alternative, or in addition to the methods described above, the journey cost calculation module 122 may use the real road distance for the journey, which is calculated using the road map from the historical database 132 and a route planning algorithm. Different rates may be used for different parts of a single journey. For example, a first per mile rate may be used for the first 10 miles of a journey and a second per mile rate may be used for the rest of the journey. The historical database 132 may also store information regarding speed limits and historical traffic data. This information may also be used by the journey cost calculation module 122 to calculate an estimated time for the journey. The estimated journey time may then form the basis of the cost calculation.

Other criteria used by the journey cost calculation module 122 when calculating the price are the type of vehicle (VIP, green, 7-seater etc.) including any special facilities the vehicle has, the method of payment and the date and time of the journey. The journey cost calculation module 122 may also apply a flat "pick-up fee" for every journey.

The journey cost calculation module 122 may also determine how much of the fare charged to the customer is passed to the driver. This may be a simple percentage of the total fare or a more complex calculation based on one or more of journey time, distance, waiting time and number of passengers.

The allocation function allocates a vehicle and driver to a booking. The allocation function is described in some detail below. In brief, a vehicle and driver are allocated to the booking, and the associated customer, having regard to a number of factors including the pick-up location specified in the booking, the drop off location specified in the booking, the service type specified in the booking, the date and time specified in the booking, the geographical distribution of the vehicles that are managed by the system 100, the demand for vehicles that are managed by the system 100 and information relating to the drivers.

The allocation function is automatic insofar as it does not require any manual involvement once the booking has been made. Once a job has been allocated to a particular driver and a particular vehicle, this is recorded in the operational database 130 with an indication that the journey has not yet been travelled.

The vehicle and driver management function includes a number of features. These include the monitoring of vehicle in terms of distance travelled etc. and ensuring that they provided for mechanical servicing at appropriate times. Drivers are managed also to ensure that documentation relating to private hire vehicle licences, insurance etc. is in place. Additionally, the function maintains a record of hours worked and jobs performed, along with any other relevant information.

The accounts management function acts to manage information relating to customer's accounts with the operator of the system 100. This includes the maintenance and management of information such as authorised users, credit limits, invoicing requirement etc.

The record keeping function acts to store various information that is created by or observed by the system 100. This information includes information about bookings yet to be fulfilled, which is included in the operational database 130.

The system 100 also comprises a vehicle share module 123. The vehicle share module 123 provides the functions of a vehicle sharing facility. In particular, vehicle share module 123 liaises with other components within the system 100 as necessary. For example, the vehicle share module 123 can interact with the call centre terminals 104, and client devices 112, 113 so that aspects of the vehicle sharing facility can be varied by a controller, system administrator or customer. Such interaction is particularly useful when a user wishes to vary certain vehicle-sharing settings as will be described later.

The vehicle sharing module 123 can interact with the web booking server 102 and the app booking server 103 to obtain information from a customer regarding use of the vehicle-sharing facility. The vehicle share module 123 can also interact with various databases of the system 100 shown in FIGS. 1*a* and 1*b* to obtain stored information necessary for the performance of vehicle-sharing functions.

The vehicle share module 123 may comprise or otherwise have access to a journey planning engine. As such, a route between two points may be plotted. The journey planning engine has access to map data, as well as data relating to traffic rules for example speed limits, information about one-way streets and information about rush hour traffic flows. The journey planning engine can also access historical data stored in the journeys travelled database 108 or the operational database 130 or historical database 132 so that past journey times for various routes can be taken into account when planning routes.

Figure 2:
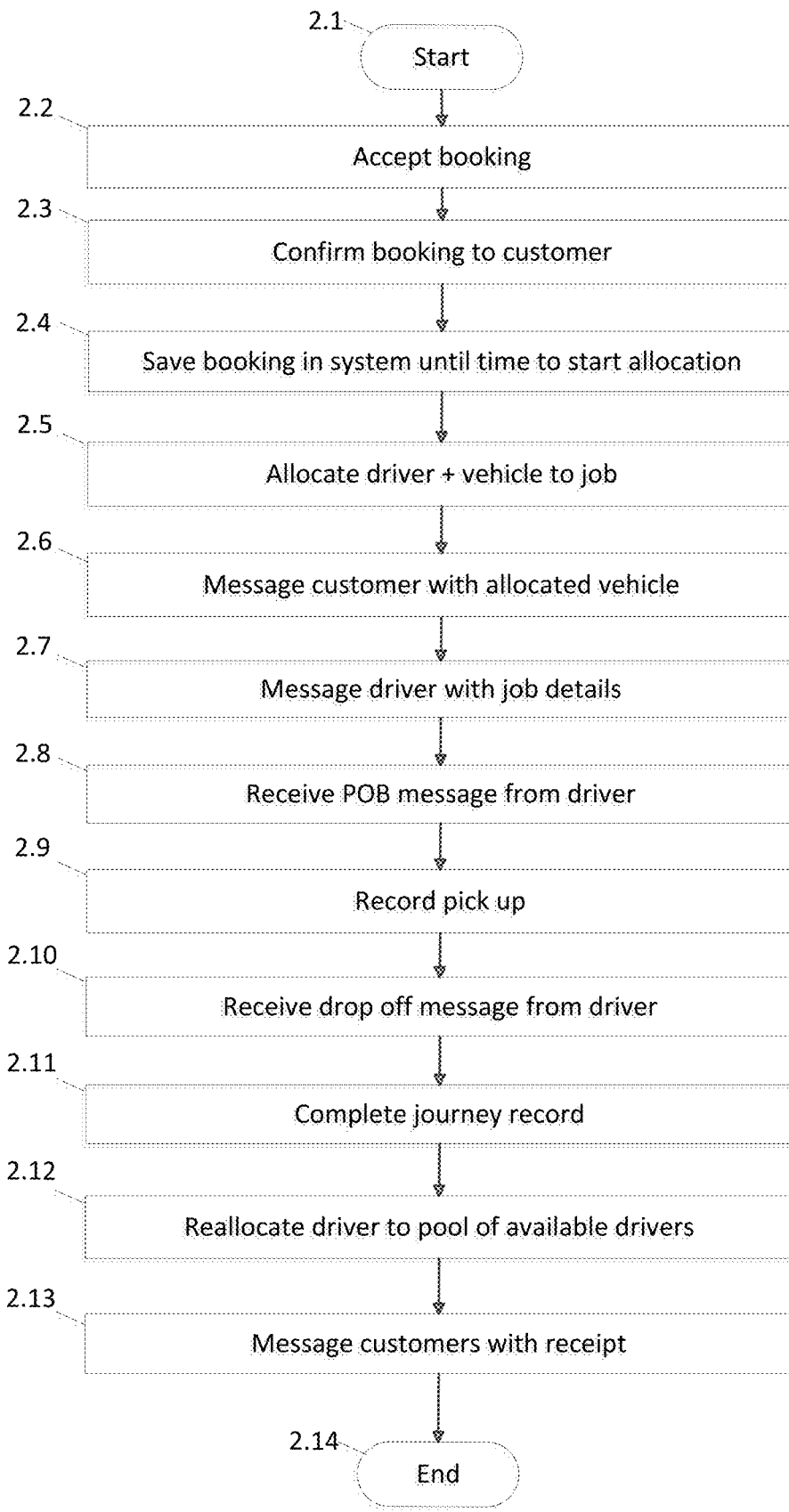
FIG. 2 is a flow chart illustrating overall operation of the system in fulfilling a booking through providing a private hire vehicle, and is performed by the system of FIG. 1a or the system of FIG. 1b.

The sequence of steps that are performed by the system during execution of a job will now be described with reference to FIG. 2. This shows execution of a relatively simple job in which there is one pick-up location, one drop-off location, no driver reallocation and no variation in the journey. Additionally, journey costing and invoicing are not covered by this Figure.

The operation starts at step 2.1. At step 2.2, a booking is accepted by the system 100. Alternative ways for accepting a booking are described above with reference to FIG. 1*a*.

At step 2.3, the booking is confirmed to the customer, for instance by email. The message sent to the customer by the system 100 includes a booking reference number and some or all of the information relating to the booking, including the pick-up and drop off locations, the date and time of pick-up etc.

At step 2.4, the system 100 saves the booking until it is time to start allocation. For an ASAP job, allocation may commence straight away. Otherwise, allocation may start a fixed time before the date and time specified for pick-up in the booking information, as is described in more detail below.

At step 2.5, the system allocates a driver and a vehicle to the job. This is discussed in relation to FIG. 3 and FIG. 4 below. On allocating the vehicle, the status of the vehicle and driver is changed from "Available" to "Allocated". This prevents the vehicle/driver being allocated to a different job until the status changes to a suitable status.

At step 2.6, the system 100 sends a message to the customer with details of the allocated vehicle. The message includes text such as 'Your vehicle is on its way'. The message also indicates the job number, which may be the same as the booking number. The message also indicates the identity of the vehicle, so that it can be readily identified by the customer. The identity of the vehicle may be indicated for instance by the registration or licence plate that is provided on the vehicle. It may also indicate the make and model of the vehicle, and/or the colour of the vehicle. Additionally, the message includes information by which the customer can contact the driver that has been allocated to the job. For instance, it may include the mobile telephone number of the driver. Providing the mobile telephone number of the driver allows the customer to call the driver with any comments or questions that they may have before the customer is collected by the vehicle. Additionally, the message includes a hyperlink to a webpage at which the location of the vehicle is shown on a map. This allows the customer to identify where the vehicle is at any stage between the vehicle being allocated to the job and the customer being collected by the vehicle.

At step 2.7, the system 100 sends a message to the driver with details of the job. The message includes various pieces of information including the name of the customer. This allows the driver to confirm the customer when the driver meets the customer at the pick-up location. The message also includes the pick-up location and the drop off location. The pick-up location and drop off location may be provided in the message in such a way that they can be extracted by the driver's device 110 and automatically placed into a navigation application that is present on the driver's device 110. This allows the driver to commence the provision by the driver's device 110 of navigation guidance to the pick-up location in response to the driver selecting the pick-up location by way of an input on the driver's device 110.

Similarly, after the customer has been collected at the pick-up location, the driver can cause the device 110 to commence providing route guidance to the drop off location by providing a suitable input on the driver's device 110.

The system may comprise a route planning module configured to run a route planning algorithm. The route planning module may access the map and location database 109 in order to calculate a route. The route planning module may also access historical traffic data in the historical database 132 and/or live traffic information in order to more accurately predict the fastest route. Once a driver has indicated that they have picked up a customer, the route planning module may provide route guidance to the driver via the driver's device 110. The route guidance may be in the form of navigation instructions. Having a centralised route planning and guidance providing system avoids the need for the driver to provide their own route guidance device and to keep such a device updated.

At step 2.8, the system 100 receives a POB (passenger on board) message from the driver. This message is transmitted by the driver's device 110 in response to the driver indicating that they have collected the customer from the pick-up location. The option to indicate POB status is provided to the driver once the driver device 110 determines that the vehicle has arrived at the pick-up location, or is within a predetermined radius (e.g. 50 m) of the pick-up location and has become stationary. However, the sending of the POB message from the driver's device 110 is not automatic. In this step, the status of the vehicle/driver is changed from "Allocated" to "POB".

Following receiving the POB message from the driver, the system 100 at step 2.9 records that the customer has been picked up. Next, the system 100 receives a drop off message from the driver at step 2.10. This is message is sent by the device 110 after the driver indicates to the driver's device 110 that the customer has been deposited at the drop off location. The option to indicate that the customer has been dropped off may be provided to the driver upon the driver's device 110 determining that the vehicle has reached the drop off location or is within a predetermined radius (e.g. 50 m) of the drop off location and has become stationary. However, the sending of the drop off message from the driver's device 110 is not automatic.

After the drop off message has been received from the driver's device 110 at step 2.11, the system 100 completes a journey record for the journey in the operational database 130 (the record was created during the booking process). The record of the journey stored in the operational database 130 includes the following information. The record includes the pick-up address and the drop off address. The information also includes the pick-up time and date and, if different, the booking time and date. The record also includes the drop off time and date, as detected by the system 100 in response to receiving the drop off message from the driver at step 2.10. The record also includes the cost of the journey, in terms of financial value.

The record also includes the travelled distance, which is not the crow fly (direct) distance between the pick-up and drop off locations but instead is the road distance travelled by the vehicle. The record also includes the journey time, in terms of minutes and seconds. The record also includes vehicle type information that indicates the type of vehicle that performs the journey.

The record also includes the booking information relating to the journey, which may include information about the identity of the customer that made the booking, the time of making the booking, the mode of making the booking (e.g. web, application or call centre) and any other relevant information relating to the booking.

Next, at step 2.12 the driver and vehicle are reallocated to the pool of available drivers. This is achieved by changing the status of the vehicle/driver to "Available" from "POB".

The customer is then messaged with a receipt for the journey travelled, if required, at step 2.13. Lastly, the operation ends at step 2.14.

Figure 3:
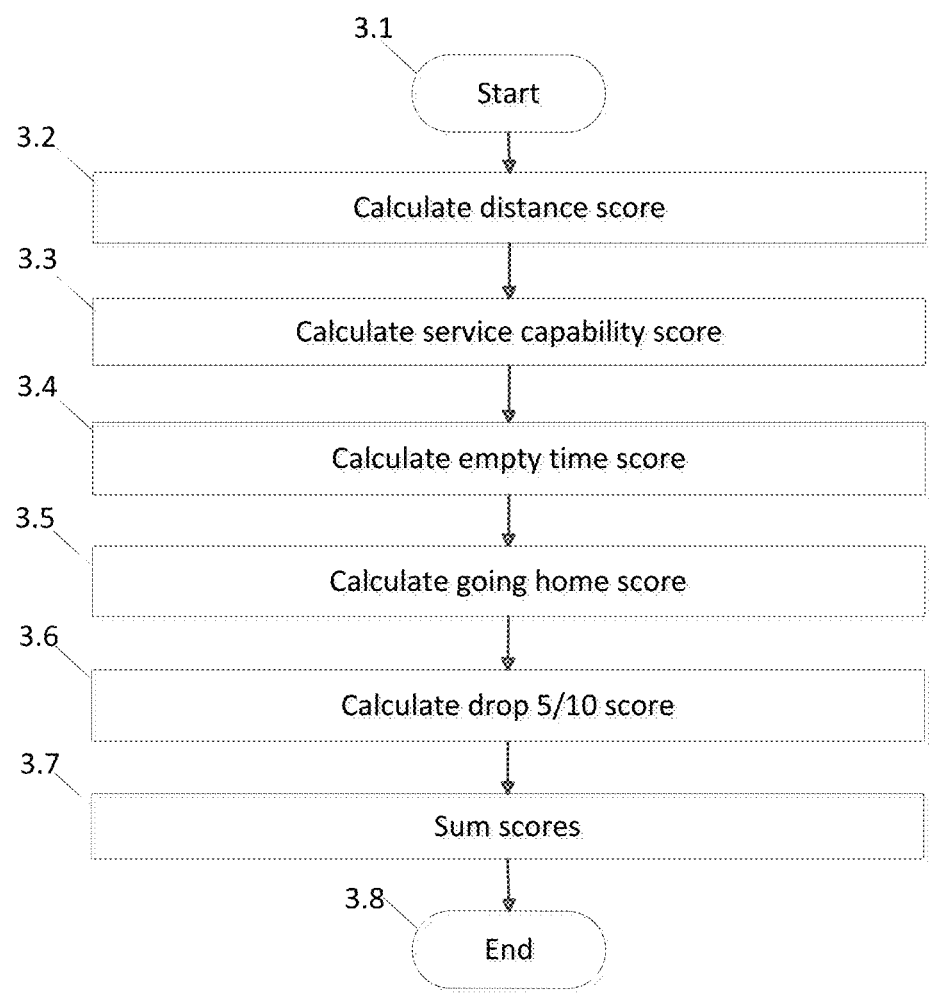
FIG. 3 is a flow chart illustrating calculating a score for a combination of a vehicle/driver pair in relation to a booking, and is performed by the system of FIG. 1a or the system of FIG. 1b.

A method of scoring a vehicle against a booking will now be described with reference to FIG. 3. The scoring process of FIG. 3 is performed by the job allocation module 105.

The operation starts at step 3.1. In brief, different scores are calculated at steps 3.2 to 3.7, and at step 3.8 the scores are summed together. Clearly, it will be appreciated that the scores may be calculated in any order, and may be calculated wholly or partly in parallel.

At step 3.2, a distance score is calculated. The distance score allows the distance between a vehicle and the pick-up location of the booking to be taken into account when scoring the vehicle against the booking. The distance score is calculated as the distance between the current position of the vehicle and the pick-up address. The distance has the unit of miles, but it may alternatively be kilometres. The distance is calculated as the distance that will need to be travelled by the vehicle to reach the pick-up address, taking into account road layout, one way streets etc. This is known as the road distance. The shortest route from the vehicle to the pick-up address is used for the distance location, even if this is not the quickest route. The route and the road distance thereof are calculated by the system 100 using information from the historical database 132. It is the last recorded position of the vehicle that is used in the distance score calculation.

An administrator or other operator of the system 100 may apply a setting such that the distance score is always zero, in which case the distance between the vehicle and the pick-up location is not taken into account in the score calculation.

At step 3.3, a service compatibility score is calculated. The service compatibility score results in the taking into account of the car type preference that was specified in the booking against the type of the vehicle that is being scored. If the type of vehicle that is being costed is the same type as that is specified in the booking, or is consistent with that type, then the service compatibility score is zero. The service compatibility score takes a positive value if there is incompatibility between the service type of the booking and the type of vehicle that is being costed. In the case of the booking specifying a VIP and the vehicle being costed being a standard vehicle, a penalty of 500 may be provided as the service compatibility score. This penalty helps to ensure that a VIP vehicle will be provided to fulfil the booking if one is available, but if not then a standard car can be provided.

In the case of the booking specifying a standard four passenger vehicle, a penalty score of 50 points is provided for a vehicle that is a seven-seater vehicle. This helps in ensuring that the booking is serviced with a suitable car, but also contributes to avoiding the removal of a large capacity vehicle from the pool of available vehicles unnecessarily.

In the case of the booking being for a standard car and the vehicle type being a VIP car, a penalty score of 100 is provided. Similarly to the situation described in relation to the larger capacity vehicle, this helps to ensure that the booking is satisfied whilst not removing VIP vehicles from the available fleet unnecessarily.

At step 3.4, an empty time score is calculated. The empty time score allows the utilisation of the vehicle (and corresponding driver) to be taken into account in the scoring of the vehicle in relation to the booking.

The empty time score is calculated as the product of −1 and the time (in minutes) since the last job allocated to the car/driver combination was completed and a cost per empty minute. The cost per empty minute is in effect a weighting factor. The weighting factor may be set by an administrator of the system 100. For a vehicle that is in the state POB, the empty time score is zero.

The inclusion of an empty time score in the operation of FIG. 3 helps to provide load balancing of the vehicles, and load balancing of the drivers. Vehicle load balancing helps to even out wear and tear on different vehicles in the fleet on a unit time basis. Load balancing of drivers is useful because it helps to prevent the likelihood of drivers performing too many consecutive jobs with insufficient breaks in between the jobs, and it also helps to reduce the likelihood that drivers will wait for long periods between jobs. Load balancing of drivers, through use of the empty time score in the costing operation, helps to prevent driver fatigue and thus improves safety.

At step 3.5, a going home score is calculated. If the status of the driver is 'going home', then a score is calculated. If the driver has some other state, then the going home score is zero.

If the driver's status is 'going home', the going home score is calculated as the product of −1 and the number of saved miles and a distance criteria. The saved miles component of the score provides a measure of how much closer to their home the driver would be if they fulfilled this booking. The saved miles component is calculated as the current distance to home (which is the road distance from the current location of the vehicle to the driver's home address) minus the distance between the drop off address and home (which is the road distance from the drop off location of the booking to the driver's home address). The distance criteria provides a weighting, and may be set by an administrator of the system 100.

The effect of the inclusion of the going home score is to increase the likelihood that a job will be allocated to a driver who is on the way to their home (for instance for a lunch break or having finished their shift) if the job would take the driver to a location that is nearer to their home. The magnitude of the score depends on the distance that would be saved, so a score is obtained if the drop off location is relatively closer to the driver's home address.

At step 3.6, a drop 5/10 score is calculated. For drivers that have a 'drop in 5' or a 'drop in 10' status, the drop 5/10 score has a positive value. For drivers that do not have a 'drop in 5' or a 'drop in 10' status, that is for drivers that are vacant and not allocated to a booking, the drop 5/10 score is zero. The status of the vehicle is set by the driver through their driver's device 110. In particular, when the driver's device 110 calculates that there are fewer than 10 minutes remaining in the journey to the drop off address, the driver's device 110 provides an option to the user to adopt the 'drop in 10' status. If the driver selects this option on the driver's device 110 (when the vehicle is stationary), the 'drop in 10' status is entered. Similarly, when the driver's device 110 detects that there are fewer than five minutes remaining in the journey to the drop off location, the driver's device 110 provides an option to allow the driver to select entering the 'drop in 5' status.

If the driver of the vehicle has a 'drop in 5' status, a score of 20 points is calculated. If the driver has the 'drop in 10' status, a score of 30 points is calculated.

The calculation of a drop 5/10 score allows vehicles that have a POB status (that is, they have a job in progress) to be considered for allocation to a booking. However, a penalty is applied to them with the result that they are less favoured than vehicles that are currently empty. This provides protection against the driver arriving late for the booking if there are unexpected delays in the previous journey.

At step 3.7, the scores calculated in steps 3.2 to 3.6 are summed, to provide a total score for the driver/vehicle/booking combination. This score is then used in an allocation process, as will now be described in reference to FIG. 4. The allocation process of FIG. 4 is performed by the job allocation module 105.

Figure 4:
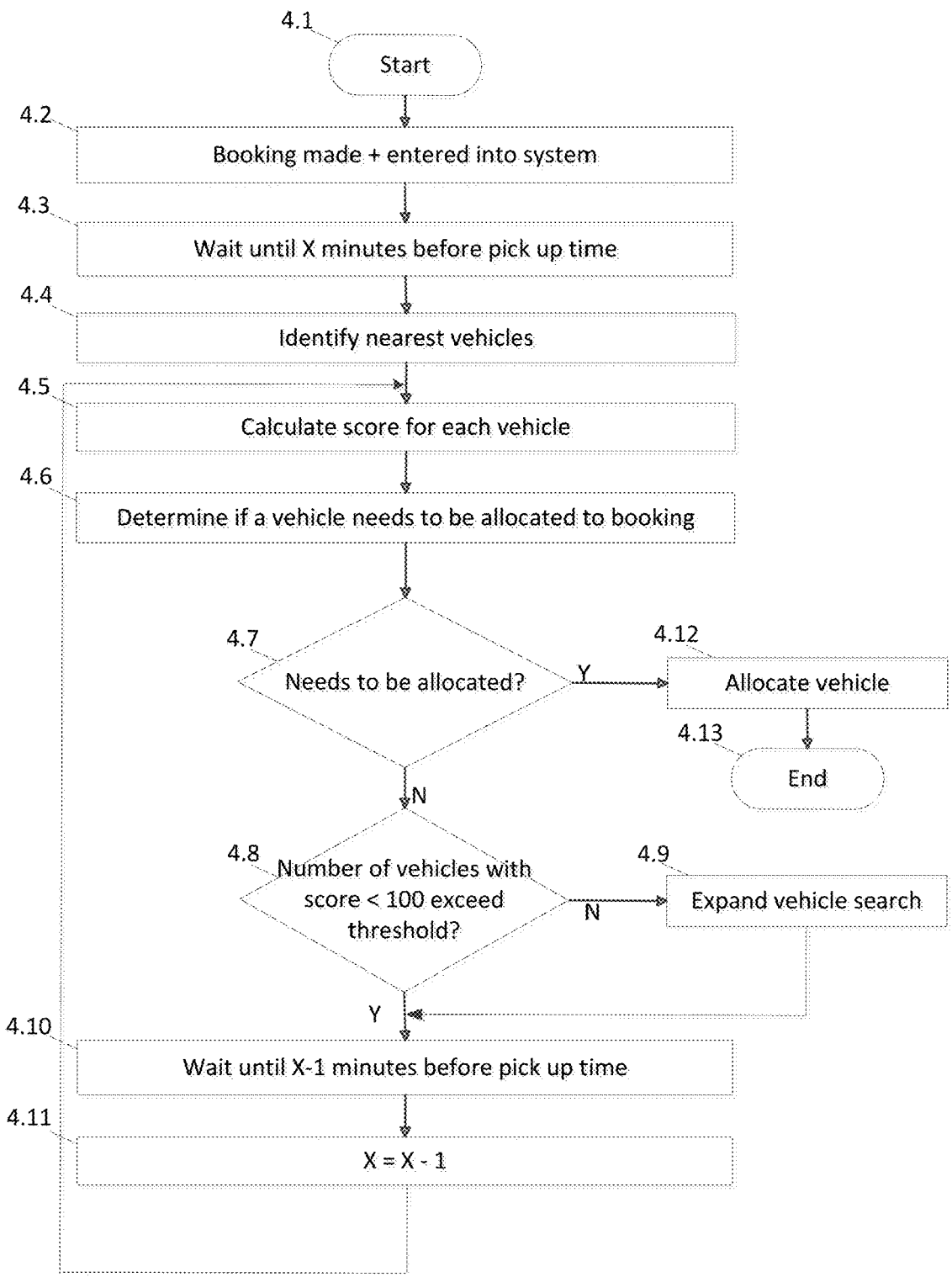
FIG. 4 is a flow chart illustrating allocation of a vehicle/driver pairing in relation to a booking, and is performed by the system of FIG. 1a or the system of FIG. 1b.

Referring to FIG. 4, the operation starts at step 4.1.

At step 4.2, a booking is made and entered onto the system. This corresponds to step 2.2 of FIG. 2.

At step 4.3, the job allocation module 105 waits until X minutes before the pick-up time for the booking. This results in the allocation process being commenced a predetermined time before the pick-up time (on the correct date). For instance, the value of X may be 20, in which case the allocation process starts 20 minutes before the scheduled pick-up time.

At step 4.4, the job allocation module 45 selects the Y vehicles that are nearest to the pick-up location of the booking. The value of Y may for instance be 20 or 30. The vehicles are determined to be nearest if they have shortest crow fly distance between their current location (which is their last reported location) and the location of the pick-up address. The distance is calculated as the straight line distance between the latitude and longitude coordinates of the location of the vehicle and the location corresponding to the pick-up address. The use of crow fly distances in step 4.4 results in an appropriate number of vehicles being selected for possible allocation to the job but without requiring the processing needed to calculate road distances and routes for each of the vehicles. In step 4.4 it is only vehicles that have the status of available, going home, drop in 5 or drop in 10 that can be selected. The result is a pool of candidate vehicles for the booking.

At step 4.5, a score is calculated for the vehicle/booking combination for each of the vehicles that were selected in step 4.4. The score is calculated as described above with reference to FIG. 3. The result is a numerical value that is an indication of the suitability of the vehicle for the booking.

At step 4.6, the job allocation module 105 determines whether a vehicle needs to be allocated to the booking. This involves determining whether there is one vehicle that is the clear best match for the booking or whether there is only one vehicle (or a small number of vehicles, e.g. 2 or 3 vehicles) that would be able to reach the pick-up location on or before the pick-up time.

There are a number of options for implementation of step 4.6, two of which will now be described.

In one alternative, a comparison is made of the scores for the vehicles as calculated in step 4.5. Because of the way the scoring is achieved, a lower numerical value indicates a greater suitability to the booking. As such, the vehicle with the lowest score is the one that is most suitable for the booking. If at step 4.6 it is determined that the vehicle with the lowest score has a score that is much lower than the second lowest score, it can be determined that the vehicle with the lowest score is sufficiently well suited to the booking that it needs to be allocated to the booking.

Alternatively, the determination that the vehicle needs to be allocated to the booking may be made if the time remaining to the pick-up time is the same as or less than a threshold amount more than the expected journey time from the lowest scoring vehicle to the pick-up address. The threshold provides a buffer. The threshold amount may be two minutes for instance. This is particularly advantageous because it results in the determination that a vehicle needs to be allocated only at the time (or perhaps shortly before the time) when the vehicle would need to leave its current location to arrive at the pick-up location in time to collect the customer on time. By making the determination in respect of the lowest scoring vehicle, it is the vehicle that is best suited to the booking that is determined to be required to be allocated to the booking even if that vehicle is not the vehicle that is closest to the pick-up location or has the shortest journey to the pick-up location.

At step 4.7, it is determined whether at step 4.6 it was determined that a vehicle needs to be allocated. If a vehicle does need to be allocated, the vehicle with the lowest score is allocated to the booking at step 4.12 before the operation ends at step 4.13.

If it is not determined that the vehicle needs to be allocated, which occurs when there is not one clear best vehicle for the booking and when there are plural vehicles that would be able to reach the pick-up location in time to meet the booking, the operation proceeds to step 4.8.

The configuration of the job allocation module 105 to allocate a vehicle to the booking at the last minute, or 'just in time', unless there is a clear best vehicle, increases the flexibility of allocation of vehicle resources of the fleet. It also contributes to reducing the overall mileage that is travelled by the vehicles of fleet in order to satisfy the bookings that are received by the system 100.

An optional step 4.8 follows step 4.7. Here, it is determined whether the number of vehicles that are reasonable candidates for allocation to the booking is sufficient. In particular, step 4.8 involves determining whether the number of vehicles with a score less than a threshold value (in this example the threshold value is 100) exceeds a threshold number of vehicles (for instance 5 vehicles). If there are insufficient vehicles, at step 4.9 the vehicles search is expanded to include further vehicles in the pool of candidate vehicles for the booking. The further vehicles are added to the vehicles that are identified at step 4.4, and the further vehicles have scores calculated for them in step 4.5 on subsequent performance of that step.

After step 4.9 or after step 4.8 revealing that there are sufficient vehicles, at step 4.10 the job allocation module 105 waits until X−1 minutes before the pick-up time. Once this time has been reached, the value of X is decremented at step 4.11 and the operation returns to step 4.5, where a new score is calculated for each vehicle in the candidate pool of vehicles. The effect of steps 4.10 and 4.11 is that scores are calculated for vehicles in the candidate pool of vehicles once every minute until a vehicle allocated to the booking.

On subsequent performance of step 4.5 in relation to a given booking, a different result may be achieved. In particular, the status and locations of the vehicles in the candidate pool of vehicles may have changed such that there now is one clear best candidate vehicle for allocation to the booking, or that the lowest scoring candidate needs to be allocated now so that they may arrive at the pick-up location in time (because the journey time from the current location of the best scoring vehicle to the pick-up location is the same as or the slightly greater than the time remaining to the pick-up time).

On subsequent execution of step 4.5, vehicles that no longer have one of the relevant statuses (available, drop in 5 or drop in 10) are removed from the candidate pool of vehicles and are not scored. As such, the size of the candidate pool of the vehicles typically reduces on subsequent executions of step 4.5. If the number of potentially suitable vehicles falls too low, this is addressed by action of steps 4.8 and 4.9, where the vehicle search is expanded and the candidate pool is added to.

It will be appreciated from the above that steps 4.5 and 4.6 are repeated until a vehicle is allocated to the booking. The number of times that the steps are repeated depends on the initial value of X, which dictates how long before the pick-up time allocation process begins, and the number of minutes before the pick-up time that the vehicle is allocated to the booking. For bookings in central city locations where there are relatively large number of vehicles, bookings may be allocated only a small number of minutes, for instance 2, 3 or 4 minutes, before pick-up times. For bookings in more remote locations, where there may be relatively few vehicles and a low vehicle density, bookings may be allocated significantly longer before the pick-up time, for instance 12, 15 or 18 minutes before the pick-up time.

For vehicle fleets with relatively low vehicle densities, having regard to the covered geographical area, a higher value of X may be appropriate. Advantageously, the value of X, which indicates the number of minutes prior to the pick-up time that the allocation process begins, may be set by an administrator of the system.

Similarly, the value of Y, which determines the number of vehicles that are identified for selection in the pool of vehicles at step 4.4 may be set by an administrator of the system 100.

Figure 1B:
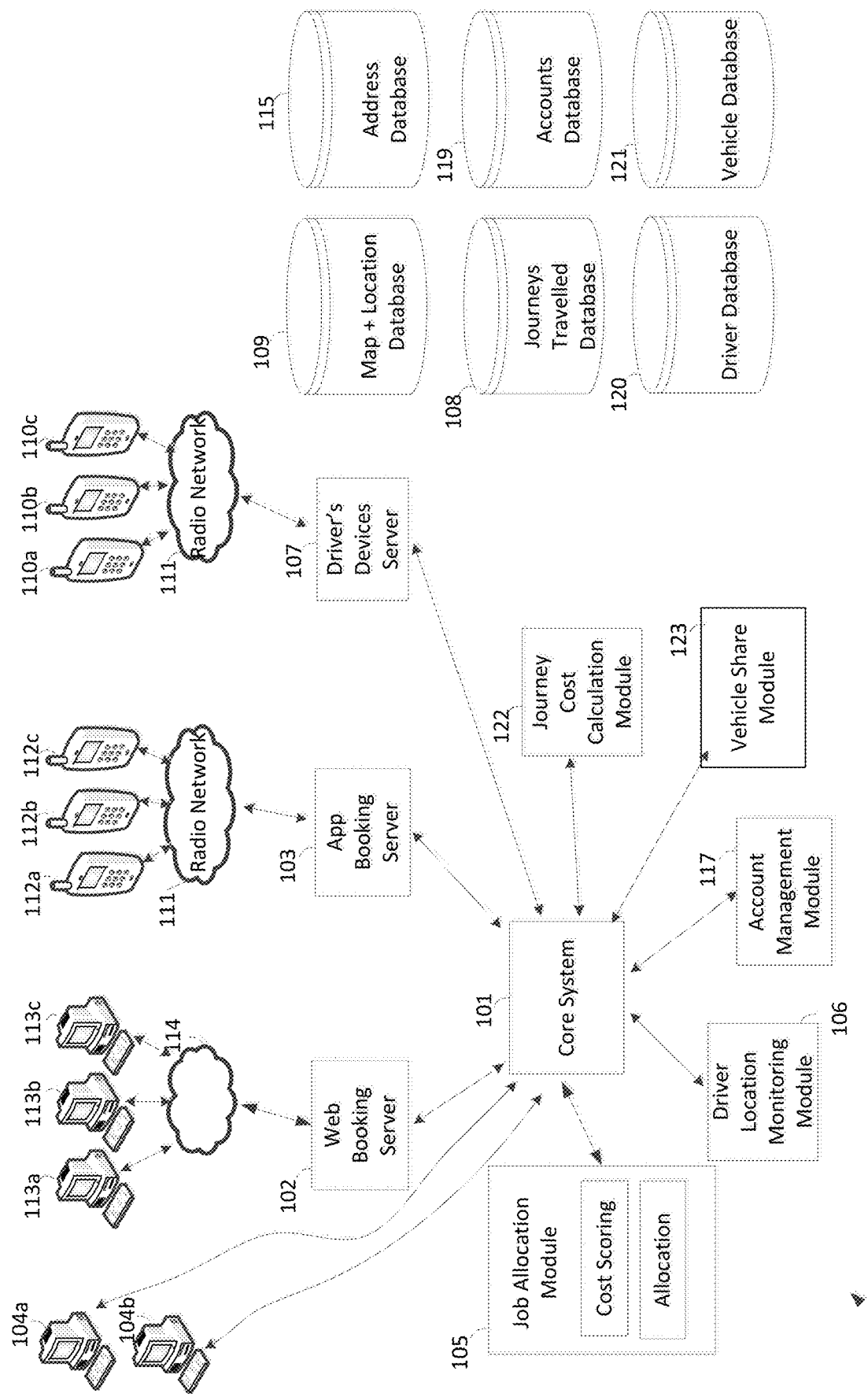
FIG. 1b is a schematic diagram of a different configuration of the FIG. 1 system for management of a private hire vehicle service according to various aspects of the present invention.

Instead of the database functions being provided by a small number of databases, in the above embodiments the operational database 130 and the driver network database 131, as well as the historical database 132, the functions may be split between a higher number of databases, as shown in the system 100 of FIG. 1*b*. Reference numerals are retained from FIG. 1*a* for like elements, and these elements are not described again here to avoid repetition.

In the FIG. 1*b* system, an accounts database 119 is configured to store the detail of every account held with the operator of the system 100. The record keeping function is provided primarily by a journeys travelled database 108 and a map and locations database 109, as well as other components of the system 100. Each vehicle has a respective record in a vehicle database 121. Each driver has a record in a driver database 120. Pick-up and drop off addresses are selected from one of the plurality of addresses stored in an address database 115. Once a job has been allocated to a particular driver and a particular vehicle, this is recorded in the journeys travelled database 108 along with an indication that the journey has not yet been travelled.

The core system 101, the web booking server 102, the application booking server 103, the job allocation module 105, the driver location monitoring module 106 and the driver's devices server 107 may be provided by a single server or by a system of cooperating servers, for instance arranged in a cluster. Each of the core system 101, the web booking server 102, the application booking server 103, the job allocation module 105, the driver location monitoring module 106 and the driver's devices server 107 includes dedicated software modules that are specific to that component. In the cases of multiple servers being used, each component may include a respective server (or more than one server) or some components may share a server or server system.

Figure 5:
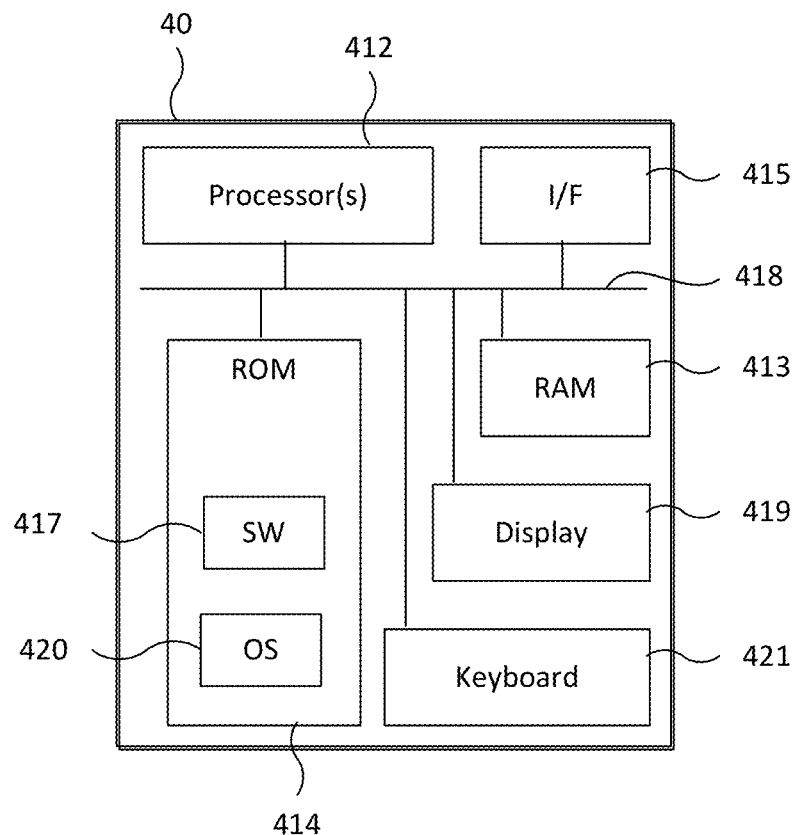
FIG. 5 is a schematic diagram illustrating components of a server forming part of the FIG. 1a or FIG. 1b system.

Whether the system 100 includes one or multiple servers, each server includes a number of features as will now be described with reference to FIG. 5. FIG. 5 shows one server 40. If the system 100 comprises plural servers, multiple versions of the FIG. 5 server 40 are connected together.

Each server 40 in the system 100 includes a processor 412. The processor 412 is connected to volatile memory such as RAM 413 by a bus 418. The bus 418 also connects the processor 112 and the RAM 413 to non-volatile memory, such as ROM 414. A communications interface 415 is coupled to the bus 418, and thus also to the processor 412 and the memories 413, 414. The interface 415 is connected to a radio network in any suitable way, for instance via the Internet or a local network. Within the ROM 414 is stored a software application 417, which includes program code that causes the server to perform the functions required of it. An operating system (OS) 420 also is stored in the ROM 414.

An output device such as a display 419 may be provided with the server 40. An input device such as a keyboard 421 may be provided with the server 40. This allows configuration, monitoring and updating by administrators and other users as required.

The server 40 may take any suitable form. Generally speaking, the server 40 comprises processing circuitry 412, including one or more processors, and a storage device 414, 413, comprising a single memory unit or a plurality of memory units. The storage device 414, 413 stores computer program instructions that, when loaded into the processing circuitry 412, control the operation of the server 40.

Figure 6:
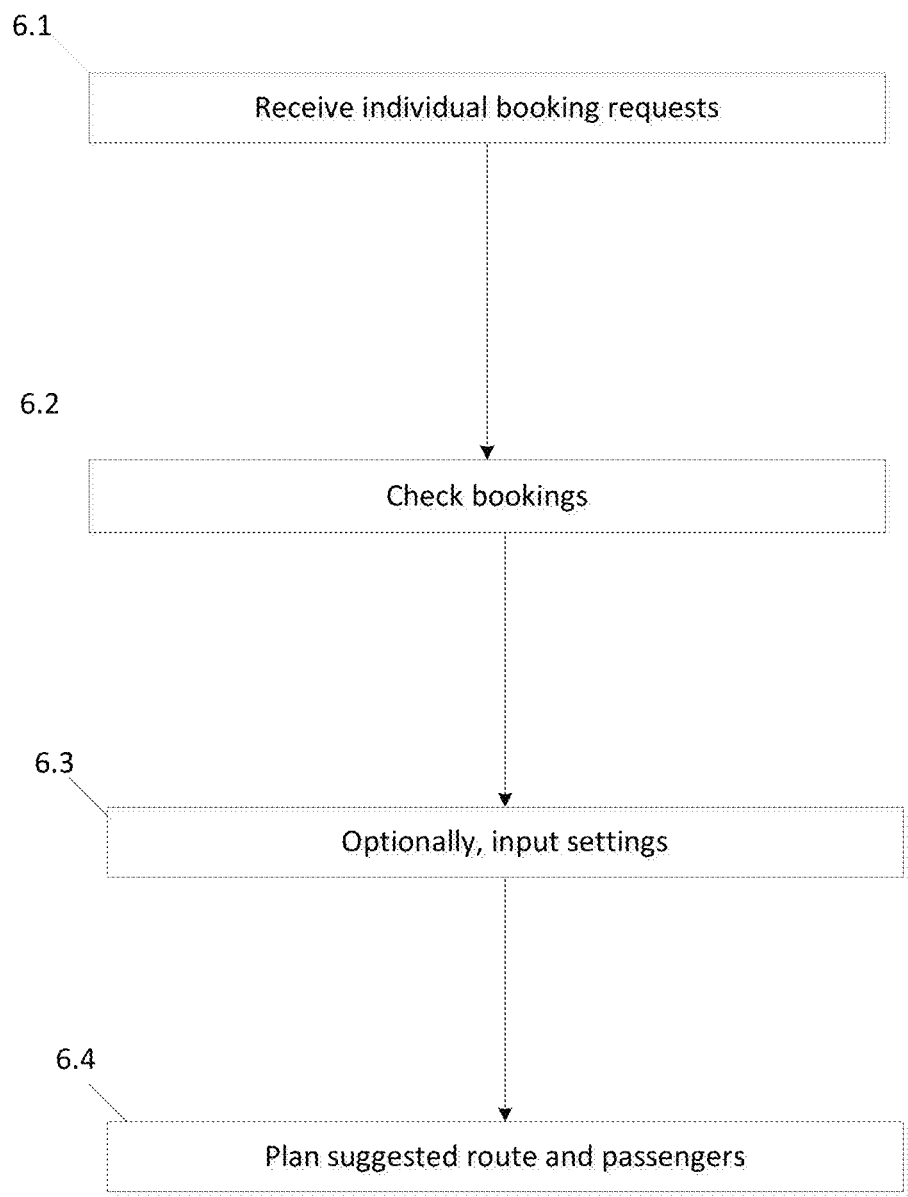
FIG. 6 is a flow chart.
Figure 7:
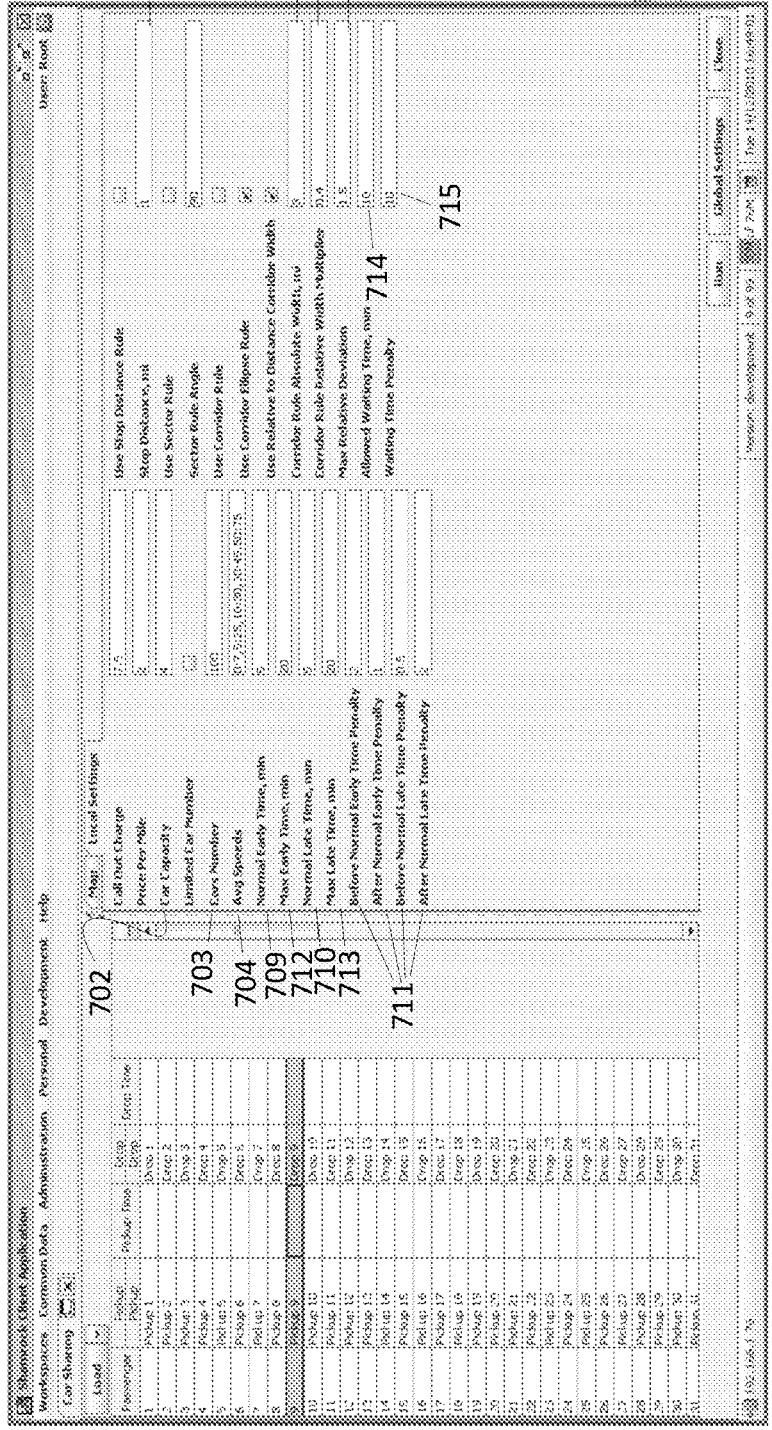
FIG. 7 shows a graphical user interface.
Figure 8:
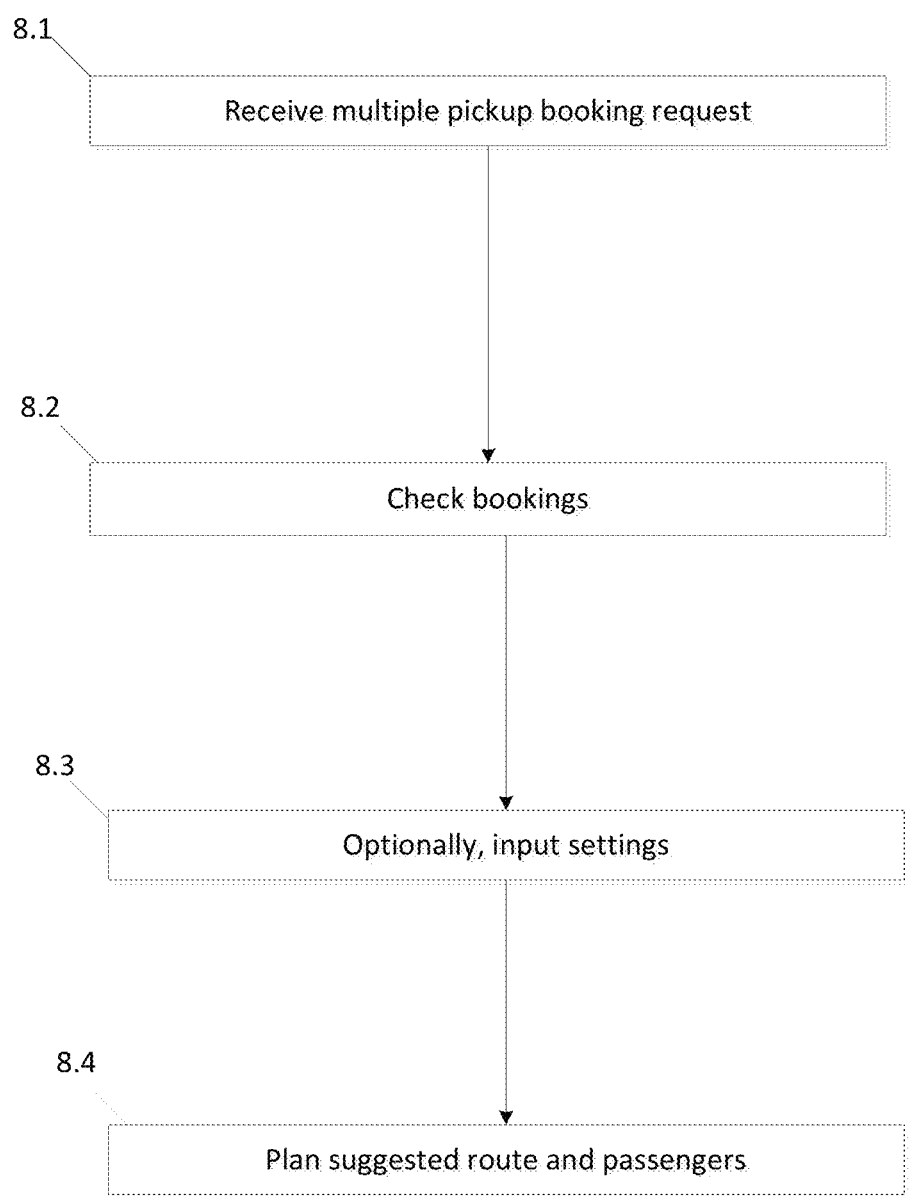
FIG. 8 is a flow chart illustrating an embodiment of the invention.

The vehicle-share facility will now be described in more detail with respect to FIGS. 6 to 8.

As stated above, the vehicle share module 123 can also interact with the web booking server 102 and the app booking server 103 to obtain information from a customer regarding use of the vehicle-sharing facility. This information can include a standing instruction from a customer that they are willing to use the vehicle sharing facility when possible. This standing instruction can apply to individual customers.

Alternatively, the standing instruction can apply to an account such as a company account. If the instruction applies to a company account, the extent of the vehicle-sharing instruction can also be varied. For example, the standing instruction allowing vehicle-share may apply only to one set of passengers (for example, junior employees), while other sets of passengers (for example, senior executives) may be excluded from vehicle-share so that when they request a vehicle booking they do not share the vehicle with other passengers. Information regarding an account's vehicle sharing preferences may be stored in the accounts database 109. Individuals within an account may be assigned a service code indicating whether they are willing to share a vehicle with another booking. When an individual makes a booking they can also issue a special instruction stating whether or not they are willing to share a vehicle with another booking.

Alternatively, a request for a particular booking may specify that the vehicle sharing facility is to be used for that booking. This ad hoc facility is useful during periods of high demand where vehicle resources may be in short supply. This may also be the case during public transport strikes. As such, customers or accounts that do not normally use vehicle sharing are still able to do so.

Vehicle-sharing can also be provided for special events. A special event vehicle booking request that specifies that a vehicle-sharing facility is to be used can be made. Bookings of this type can be made over the phone or via the web or app portal. An individual belonging to the account may have an account administrator privilege which gives them permission to make general bookings of this kind. Details of the special event booking may be entered into a preformatted spreadsheet so that information contained in the booking may be processed efficiently.

Information included in a special event booking request can include the date of the special event, the time period during which the vehicle-sharing facility is to be provided, and a location of the special event. One or more communal pick-up points may also be appointed for all vehicle bookings that occur during the special event. A geofence may also be established to provide a geographical area within which any vehicle booking requests that relate to the special event will make use of the vehicle-sharing facility. Vehicle booking requests stating a pick-up location outside the geofence will not use the vehicle-sharing facility.

During the special event, the system 100 receives individual vehicle booking requests from customers. The vehicle-share module 123 looks up customer details in the accounts database 109 and checks whether the customer belongs to an account having a special event booking. If the customer belongs to an account having a special event booking, the vehicle booking can be processed using the vehicle-sharing facility.

The vehicle share module 123 can specify a certain timeframe which can be stored in the accounts database 109. The timeframe can specify that only those vehicle bookings having a pick-up time within a certain time window can qualify for vehicle-share. For example, a window of ten minutes may be set. For example, if journey B has a pick up time within 10 minutes of journey A then B may be eligible for vehicle sharing subject to the other criteria described herein.

When a booking request is received for a particular journey, a route may be planned between the pick up point and drop off point and the route distance calculated. If the route distance exceeds a vehicle-sharing distance threshold, the journey may be considered to be eligible for vehicle share. If a distance is less than a particular threshold, it may not be worthwhile using the vehicle sharing facility. Having a distance threshold is an optional requirement. Any, some or all of the vehicle sharing criteria described below in the criteria overview may be used to determine whether the vehicle sharing facility should be used.

In some embodiments, the vehicle resources are autonomous vehicles, also known as driverless vehicles or driverless cars. Where the system 100 comprises autonomous vehicles, each driver device 110 is replaced with an on-board control system, which can be termed an autonomous mode controller. The autonomous mode controller controls the speed and direction of the autonomous vehicle and maintains an accurate record of the unmanned vehicle's location and orientation. Autonomous driving sensors may include any number of devices configured to generate signals that help navigate the vehicle while the vehicle is operating in an autonomous (e.g., driverless) mode. The autonomous vehicle may comprise a number of cameras and other sensors, including LIDAR and/or radar sensors, which feed information about the vehicle's surroundings to the on-board operating system. The information includes the position, constitution, orientation and velocity of nearby objects, including other vehicles. The autonomous driving sensors help the vehicle "see" the roadway and the vehicle surroundings and/or negotiate various obstacles while the vehicle is operating in the autonomous mode. The on-board operating system may communicate with the core system 101 via the radio network 111 using any suitable protocol.

The autonomous mode controller may be configured to control one or more subsystems while the vehicle is operating in the autonomous mode. Examples of subsystems that may be controlled by the autonomous mode controller may include a brake subsystem, a suspension subsystem, a steering subsystem, and a powertrain subsystem. The autonomous mode controller may control any one or more of these subsystems by outputting signals to control units associated with these subsystems. The autonomous mode controller may control the subsystems based, at least in part, on signals generated by the autonomous driving sensors.

The autonomous vehicles may have on-board route planning modules as part of the autonomous mode controller. Upon the autonomous vehicle receiving information representing a start and end location for a route, the on-board route planning module accesses the map and location database 109 and optionally traffic data in the historical database 132 and/or live traffic information to calculate a best route. The autonomous vehicle may also be given information representing one or more waypoints to travel to between the start and end locations, or a number of waypoints or locations which can be travelled to in any order. The route planning module may then calculate the most efficient route to take to visit each of the locations.

Alternatively, the autonomous vehicle may not have an on-board route planning module and may instead receive route information, i.e. information specifying one or more routes, or navigation instructions from the core system 101.

The way in which a journey is planned using a vehicle-sharing facility will now be described with respect to two operational modes.

The first mode involves a common pickup point and multiple destinations or drop-off points. The drop-off points may be thought of as stops along a route. This mode is useful for vehicle sharing after major events such as the special events described above, for example a company Christmas party. Henceforth, this mode will be referred to the "single pick-up mode".

The second mode involves multiple pickup points and at least one destination. This mode may be employed for more general vehicle sharing in complex scenarios. This mode allows for setting a pickup time for each pickup point. This mode will be referred to hereinafter as "multiple pick-up mode". The initial pick up may be thought of as the journey start point and the final drop off thought of as the journey end point. Intermediate pickup and drop-off points may be thought of as stops along the way.

Multiple pick-up mode can also be used in scenarios where there are multiple pickups and a single destination (i.e., the reverse scenario of "single pick-up mode"). This particular scenario may be useful to drop passengers off at a special event such as a company Christmas party.

The steps that are performed to manage a vehicle-sharing facility in single pick-up mode will now be described with reference to FIG. 6.

At step 6.1, multiple vehicle booking requests, specifying a common pick-up location, are received at the system 100. Each booking request has a distinct drop-off location. At step 6.2, these booking requests are checked by the vehicle sharing module 123. The vehicle sharing module 123 checks the identity of the customer of each booking and verifies whether the booking should be processed using the vehicle-sharing facility. As stated above, a booking can be processed using the vehicle-sharing facility if there is a standing instruction or if the booking relates to a special event.

Step 6.3 is an optional step. Various settings may be inputted at a user interface 701 having fields for text entry and check boxes, as shown in FIG. 7. The settings may be inputted by a controller at a terminal 104. Additionally, entry of the settings may be fully automated. For example, a specific service code may be entered for a particular type of special event booking or for a specific account which automatically dictates what criteria should be applied.

Information about various properties of vehicles to be used in vehicle sharing can be inputted. Where similar types of car are to be used for all bookings using the vehicle-sharing facility a user can specify the number of vehicles and the number of passengers per vehicle. In more complex scenarios, different vehicle types may be used and the desired passenger capacity of each vehicle used can be altered. For example, a user can specify that 3 VIP vehicles are to be used with 2 passengers each, 10 standard cars are to be used carrying 4 passengers each and 20 standard cars are to be used carrying 3 passengers each. A user can also set a custom speed for each car. As will be understood, setting a custom speed is advantageous since it allows the user to influence the routes that will be suggested. For example, specifying a faster speed will lead to vehicles being able to cover longer routes. The selection of a custom speed may depend on the time of day or on other known road conditions and in particular rush hour or night time traffic conditions may be taken into account when selecting the speed. Similarly, if an administrator is aware of road works leading to congestion that will likely slow the vehicle down, they can set the custom speed accordingly.

While these settings can be altered at a user interface, in alternative embodiments, account-specific settings may be stored in the accounts database 109 and retrieved when a vehicle-sharing facility is to be used for a specific account.

An overview of further settings that may be inputted is given below in the Settings Overview.

At step .4, the vehicle sharing module 123 automatically selects customers to share a vehicle and plans a suggested route for the vehicle using the pick-up location and drop-off locations of the customers as stops along a route.

The vehicle sharing module 123 analyses the pick-up and drop-off locations and uses them to plan potential routes in accordance with the specified settings and in accordance with any account-specific requirements. Each potential route that is identified may be ranked. The ranking may depend on the total estimated journey time and/or the total journey distance for each potential route. For each potential route, further statistical information may be obtained, for example the total saved distance (i.e. relative cost savings), total extra distance per passenger (i.e. how much further passengers had to travel due to vehicle sharing). This further statistical information can also be used to rank the various potential routes. The potential route having the highest ranking may then be selected as the suggested route.

The suggested route together with a suggested list of passengers in a vehicle may then be stored in the system 100 as a booking. Details of the suggested route may also be sent to a customer device along with the names of the passengers selected to share a vehicle. This booking may then be allocated near to the booking time.

The steps that are performed to manage a vehicle-sharing facility in multiple pick-up mode will now be described with reference to FIG. 8. Most of the steps are substantially similar to those shown in FIG. 6 and therefore the following discussion will centre on the substantive differences between the process shown in FIG. 8 and the process shown in FIG. 6.

At step 8.1, vehicle booking requests are received. Each booking request specifies a drop-off location and a pick-up location. In this mode, the pick-up location of each customer is unique. The drop-off location of each customer can be unique as well or it can be the same drop-off location for each customer. Step 8.2 is substantially similar to the step 6.2.

The step 8.3 is largely similar to the step 6.3 except that some of the settings that can be entered may be different. The settings overview sets out which settings can be applied in each mode.

Step 8.4 is substantially similar to the step 6.4.

Criteria Overview

The following criteria are applicable in both operational modes. These criteria may be provided automatically and/or may be varied by a user.

Vehicle Capacity 702—determines generic vehicle capacity, i.e., the number of passengers that can be carried in each vehicle.

Vehicles Number 703—determines the number of vehicles which should be used for processing the received vehicle booking requests using the vehicle sharing facility.

Custom Speeds 704—determines average speed for a vehicle. This can be inputted manually via the user interface to influence the routes that will be suggested. Where a faster average speed is inputted longer routes may be proposed by the system 100.

Stop Distance threshold value 705—limits ability to vehicle share according to distance to next stop on a route. No routes will be selected that have inter-stop distances greater than this threshold value. A checkbox may be provided to enable or disable this setting.

Corridor Width—suitability of a stop for vehicle sharing is determined by corridor width, instead of distance to next stop. A virtual corridor having a certain width can be defined between two stops on a route. Any other potential stops that lie outside the corridor can be excluded from the route. The corridor width can be defined as an absolute width 706, e.g. 3 miles.

Alternatively, a relative distance setting can be used to increase corridor width relative to distance to next stop. For example, the corridor width could be set using a relative width multiplier 707 which is multiplied with the distance to the next stop. For example, the relative width multiplier could be set at 0.4. The corridor can be rectangular or elliptical.

Maximum Relative Deviation 708—defines maximum allowed deviation to a stop on the way from a journey start point to a journey destination. A straight line may be defined between the journey start point and the journey destination. If a potential intermediate stop is further away from this line than the threshold Maximum Relative Deviation threshold 708, the stop is excluded from the route.

The following settings are applicable in multiple pick-up mode only. In multiple pick-up mode, the customer can specify a pick-up time when they make a vehicle booking request. When plotting a possible vehicle-share route, it is necessary to reconcile the customer's requested pick-up time with stops along the route. Certain rules are therefore used to define acceptable gaps between a requested pick-up time and the pick-up time for that customer along the route.

Normal early time 709 and normal late time 710—define thresholds either side of the requested pick-up time within which a pick up time is deemed to be normal.

Penalty scores 711—if a pick up time of a potential route falls within the window defined by the normal early time and normal late time a penalty may be applied to that route. When comparing potential routes, a route having a lower penalty will be selected in advance of a route having a higher penalty.

Maximum Early time 712 and Maximum Late Time 713—define thresholds either side of the requested pick-up time within which a pick up time is acceptable. A pick up time outside this window will be rejected.

Allowed Waiting Time 714 and Waiting Time Penalty 715—defines a maximum allowed waiting time for a vehicle and a penalty that may be applied to a route that involves making a vehicle wait.

EXAMPLE

A specific example will now be described to further illustrate how a shared journey may be determined. It should be borne in mind that the example below applies to both "single pick up" and "multiple pick up" modes.

Customers A, B, C each make bookings which are received by the system 100. A specifies pick up location $P_1$ and drop off location $D_1$. B specifies pick up location $P_2$ and drop off location $D_2$. C specifies pick up location $P_3$ and drop off location $D_3$. In single pick up mode $P_1$, $P_2$ and $P_3$ are the same location. In this example, customers A, B and C each wish to make use of the vehicle sharing facility. As discussed above, this wish may be in the form of a standing instruction or because of a special event. Alternatively, an ad hoc request for a particular booking may specify that the vehicle sharing facility is to be used.

Journey A can then be designated a base journey. A route from $P_1$ to $D_1$ may be planned by the journey planning engine. The distance from $P_1$ to $D_1$ may also be evaluated.

In embodiments where a distance threshold is used, this distance may be compared with a threshold X, whereby if the threshold is exceeded, it is determined that journey A may be eligible to be shared.

To determine whether journey A can be shared with journey B, the locations $P_2$ and $D_2$ of journey B are analysed in accordance with the vehicle-share criteria. In examples where a Maximum Relative Deviation is set, the deviation in journey A that is required to accommodate journey B is compared with the Maximum Relative Deviation 708. If the deviation in A exceeds the Maximum Relative Deviation then adding journey B to journey A is rejected as a potential route.

However, if the vehicle-share criteria are satisfied, journey B can be added to journey A by the journey planning engine to form a potential route (A+B). A score is then calculated for this potential route. The score can be derived from the total distance, time or financial cost. The financial cost can be calculated using the journey cost calculation module 122.

The same process may be followed with C, whereby the locations $P_3$ and $D_3$ of journey C are analysed in accordance with the vehicle-share criteria. If satisfied, journey C can be added to journey A to form a potential route (A+C). As above, a score may be calculated for this potential route.

Additionally, the journey C may be added to the potential route (A+B) to form a further potential route (A+B+C) as long as such a potential route satisfies the vehicle-share criteria. If the vehicle-share criteria are satisfied, a score can be calculated for the potential route (A+B+C).

Even if (A+B+C) is identified as a potential route, the possibility of A and B sharing a vehicle while C is allocated its own vehicle can also be considered and scored. In other words, the combined score for (A+B) in a first vehicle can be added to C in a second vehicle and then compared to a potential route (A+B+C) whereby A, B and C all travel together in a single vehicle.

In addition to scoring possible routes where A is used as the base journey, scores are also calculated for potential routes whereby B and C are used as the base journey.

The vehicle share module 123 plans a route from $P_2$ to $D_2$. Journey B can then be designated a base journey. Scores may then be calculated for potential routes (B+A), (B+C), (B+C+A) in a similar manner to that described above using the vehicle share criteria.

As will be understood, the same process can be applied whereby C is considered for suitability as a base journey and potential routes identified and scored.

As such, all permutations of vehicle sharing may be considered, whereby each potential route has a score. The potential journeys may then be ranked and the highest ranking journey selected.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

Reference to "computer-readable storage medium", "computer program product", "tangibly embodied computer program" etc., or a "processor" or "processing circuit" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

It should be realised that the foregoing embodiments are not to be construed as limiting and that other variations and modifications will be evident to those skilled in the art and are intended to be encompassed by the claims unless expressly excluded by the claim language when taking into account equivalents. Some such alternatives and modifications will now be described.

In the above, journey cost calculation is performed at the time of a booking and the result returned to the customer requesting the booking. Cost calculation may alternatively be performed ahead of the booking being made (for instance on the basis of an agreed tariff), at the end of fulfilment of the booking, or at a later time.

Additionally, the cost scoring of a vehicle against a booking may be performed in any suitable way. Also, cost scoring may be performed only once and the best vehicle allocated at that time, rather than cost scoring being performed until it is decided to allocate a vehicle.

Moreover, the disclosure of the present application should be understood to include any novel features or any novel combination of features either explicitly or implicitly disclosed herein or in any generalisation thereof and during prosecution of the present application or of any application derived therefrom, new claims may be formulated to cover any such features and/or combination of such features.

The invention claimed is:

1. A method of sharing autonomous vehicles from a fleet of available autonomous vehicles, the method comprising:
   (a) detecting a plurality of inputs corresponding to vehicle booking requests from customers for the autonomous vehicles, wherein each request from a customer includes
      data identifying a drop-off location and a pick-up location that is distinct from the pick-up location of other customers,
      a vehicle type preference, wherein vehicle types include a VIP car and a standard car, and
      a vehicle capacity;
   (b) accessing a data structure containing stored data relating to user authorisations for using a vehicle-sharing facility to verify whether each of the vehicle booking requests relates to a customer authorised to use the vehicle-sharing facility; and
   for those vehicle booking requests relating to customers identified as being authorised to use the vehicle-sharing facility:
   (c) automatically selecting customers to share an autonomous vehicle and calculating a suggested route for the autonomous vehicle using the pick-up location and drop-off locations of the customers and one or more stored vehicle-share criteria, the automatically selecting customers to share the autonomous vehicle and calculating the suggested route including
      selecting candidate combinations of customers to share a vehicle according to one or more vehicle share criteria,
      identifying potential routes for each candidate combination of customers,
      calculating a score for each route of the potential routes for each candidate combination of customers, and
      selecting the potential route determined to have a best score, the selected potential route being associated with a particular candidate combination of customers;
   calculating scores for the autonomous vehicles in the fleet based on the booking requests;
   selecting an autonomous vehicle from the fleet based on the calculated scores; and
   (d) controlling the selected autonomous vehicle to follow the selected route.

2. The method of claim 1, wherein each customer request contains data specifying the same drop-off location.

3. The method of claim 1, wherein each customer request contains data specifying a drop-off location that is distinct from the drop-off location of each of the other customers.

4. The method of claim 1, further comprising detecting one or more user inputs relating to the one or more vehicle-share criteria at a user interface and using these values at (c).

5. The method of claim 4, wherein the vehicle-share criteria comprise data representing a vehicle number.

6. The method of claim 5, wherein the data representing vehicle number specifies a number of vehicles in each of a plurality of vehicle types.

7. The method of claim 4, wherein the vehicle-share criteria comprise data representing an average speed value.

8. The method of claim 4, wherein the vehicle-share criteria comprise data representing a stop distance.

9. The method of claim 4, wherein the vehicle-share criteria comprise data representing a corridor rule absolute width and/or a corridor rule relative width multiplier.

10. The method of claim 4, wherein the vehicle-share criteria comprise data representing a maximum relative deviation.

11. The method of claim 4, wherein the vehicle-share criteria comprise data representing at least one of the following:
a normal early time value, a maximum early time value, a normal late time value, and a maximum late time value.

12. The method of claim 11, wherein the vehicle-share criteria further comprise data representing at least one of the following:
a before normal early time penalty, an after normal early time penalty, a before normal late time penalty and an after normal late time penalty.

13. The method of claim 4, wherein the vehicle-share criteria comprise data representing an allowed waiting time and a waiting time penalty.

14. The method of claim 1, wherein verifying whether each of the customers is authorised to use the vehicle-sharing facility comprises determining if a customer record is associated with an account having an instruction allowing vehicle share.

15. The method according to claim 1, wherein
the calculating the score for each route of the potential routes includes accessing a database storing historical data representing travel times for past trips and incorporating the historical data into the score for each route.

16. The method according to claim 15, wherein
the calculating scores for the autonomous vehicles includes calculating an empty time score that represents how long it has been since a specific autonomous vehicle has been utilized, and
the selecting the autonomous vehicle from the fleet prioritizes autonomous vehicles that have been utilized less recently than other autonomous vehicles in the fleet to thereby even out wear and tear on the autonomous vehicles in the fleet.

17. A non-transitory computer-readable storage medium having stored thereon computer-readable code, which, when executed by a computing apparatus, causes the computing apparatus to perform a method of sharing autonomous vehicles from a fleet of available autonomous vehicles, the method comprising:
(a) detecting a plurality of inputs corresponding to vehicle booking requests from customers for the autonomous vehicles, wherein each request from a customer includes
data identifying a drop-off location and a pick-up location that is distinct from the pick-up location of other customers,
a vehicle type preference wherein vehicle types include a VIP car and a standard car, and
a vehicle capacity;
(b) accessing a data structure containing stored data relating to user authorisations for using a vehicle-sharing facility to verify whether each of the vehicle booking requests relates to a customer authorised to use the vehicle-sharing facility; and
for those vehicle booking requests relating to customers identified as being authorised to use the vehicle-sharing facility:
(c) automatically selecting customers to share an autonomous vehicle and calculating a suggested route for the autonomous vehicle using the pick-up location and drop-off locations of the customers and one or more stored vehicle-share criteria, the automatically selecting customers to share the autonomous vehicle and calculating the suggested route including
selecting candidate combinations of customers to share a vehicle according to one or more vehicle share criteria,
identifying potential routes for each candidate combination of customers,
calculating a score for each route of the potential routes for each candidate combination of customers, and
selecting the potential route determined to have a best score, the selected potential route being associated with a particular candidate combination of customers;
calculating scores for the autonomous vehicles in the fleet based on the booking requests;
selecting an autonomous vehicle from the fleet based on the calculated scores; and
(d) controlling the selected autonomous vehicle to follow the selected route.

18. The non-transitory computer-readable storage medium according to claim 17, wherein
the calculating the score for each route of the potential routes includes accessing a database storing historical data representing travel times for past trips and incorporating the historical data into the score for each route,
the calculating scores for the autonomous vehicles includes calculating an empty time score that represents how long it has been since a specific autonomous vehicle has been utilized, and
the selecting the autonomous vehicle from the fleet prioritizes autonomous vehicles that have been utilized less recently than other autonomous vehicles in the fleet to thereby even out wear and tear on the autonomous vehicles in the fleet.

19. Apparatus having at least one processor and at least one memory having computer-readable code stored thereon which when executed controls the at least one processor to share autonomous vehicles from a fleet of available autonomous vehicles by:
(a) detecting a plurality of inputs corresponding to vehicle booking requests from customers for the autonomous vehicles, wherein each request from a customer includes
data identifying a drop-off location and a pick-up location that is distinct from the pick-up location of other customers,
a vehicle type preference wherein vehicle types include a VIP car and a standard car, and
a vehicle capacity;
(b) accessing a data structure containing stored data relating to user authorisations for using a vehicle-sharing facility to verify whether each of the customers is authorised to use the vehicle-sharing facility; and
for those vehicle booking requests relating to customers identified as being authorised to use the vehicle-sharing facility:
(c) automatically selecting customers to share an autonomous vehicle and calculating a suggested route for the autonomous vehicle using the pick-up location and drop-off locations of the customers and one or more stored vehicle-share criteria, the automatically selecting customers to share the autonomous vehicle and calculating the suggested route including
selecting candidate combinations of customers to share a vehicle according to one or more vehicle share criteria, identifying potential routes for each candidate combination of customers, calculating a score for each route of the potential routes for each candidate combination of customers, and selecting the potential route determined to have a best score, the selected potential route being associated with a particular candidate combination of customers;

calculating scores for the autonomous vehicles in the fleet based on the booking requests;

selecting an autonomous vehicle from the fleet based on the calculated scores; and (d) controlling the selected autonomous vehicle to follow the selected route.

20. The apparatus according to claim 19, wherein the calculating the score for each route of the potential routes includes accessing a database storing historical data representing travel times for past trips and incorporating the historical data into the score for each route, the calculating scores for the autonomous vehicles includes calculating an empty time score that represents how long it has been since a specific autonomous vehicle has been utilized, and the selecting the autonomous vehicle from the fleet prioritizes autonomous vehicles that have been utilized less recently than other autonomous vehicles in the fleet to thereby even out wear and tear on the autonomous vehicles in the fleet.

* * * * *